United States Patent
Luo et al.

(10) Patent No.: US 12,548,107 B2
(45) Date of Patent: Feb. 10, 2026

(54) MACHINE-LEARNED MODELS FOR IMPERCEPTIBLE MESSAGE WATERMARKING IN VIDEOS

(71) Applicant: Google LLC, Mountain View, CA (US)

(72) Inventors: Xiyang Luo, Pasadena, CA (US); Feng Yang, Sunnyvale, CA (US); Ce Liu, Cambridge, MA (US); Huiwen Chang, Jersey City, NJ (US); Peyman Milanfar, Menlo Park, CA (US); Yinxiao Li, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 241 days.

(21) Appl. No.: 18/256,783

(22) PCT Filed: Mar. 24, 2021

(86) PCT No.: PCT/US2021/023867
§ 371 (c)(1),
(2) Date: Jun. 9, 2023

(87) PCT Pub. No.: WO2022/203665
PCT Pub. Date: Sep. 29, 2022

(65) Prior Publication Data
US 2024/0020788 A1    Jan. 18, 2024

(51) Int. Cl.
*G06T 1/00* (2006.01)
(52) U.S. Cl.
CPC .... *G06T 1/0085* (2013.01); *G06T 2201/0083* (2013.01)
(58) Field of Classification Search
CPC ................................................ G06T 1/0085
See application file for complete search history.

(56) References Cited

U.S. PATENT DOCUMENTS

| 2014/0270338 | A1* | 9/2014 | Zhao | G06T 1/0028 |
| | | | | 382/100 |
| 2015/0086067 | A1* | 3/2015 | Mehta | G06T 1/0071 |
| | | | | 382/100 |
| 2021/0067842 | A1 | 3/2021 | Revital et al. | |

FOREIGN PATENT DOCUMENTS

WO   WO-2019190886 A1 * 10/2019   ........... G06F 18/213

OTHER PUBLICATIONS

Abdolmohammadi et al., "Video Steganography Using 3D Convolutional Neural Networks: Third Mediterranean Conference, MedPRAI 2019, Istanbul, Turkey, Dec. 22-23, 2019, Proceedings", in "Methods and Applications fr Modeling and Simulation of Complex Systems: 18$^{th}$ Asia Simulation Conference, AsiaSim 2018, Kyoto, Japan, Oct. 27-29, 2019, ProceedingS", Jan. 1, 2020, Springer, Singapore, vol. 1144, http://link.springer.com/content/pdf/10.1007/978-3-030-37548-5_12, XP055872775, pp. 149-161.

(Continued)

*Primary Examiner* — Clayton R Williams
(74) *Attorney, Agent, or Firm* — DORITY & MANNING, P.A.

(57) ABSTRACT

Systems and methods of the present disclosure are directed to a computing system. The computing system can obtain a message vector and video data comprising a plurality of video frames. The computing system can process the input video with a transformation portion of a machine-learned watermark encoding model to obtain a three-dimensional feature encoding of the input video. The computing system can process the three-dimensional feature encoding of the input video and the message vector with an embedding portion of the machine-learned watermark encoding model to obtain spatial-temporal watermark encoding data descriptive of the message vector. The computing system can generate encoded video data comprising a plurality of (Continued)

encoded video frames, wherein at least one of the plurality of encoded video frames includes the spatial-temporal watermark encoding data.

20 Claims, 9 Drawing Sheets

(56) References Cited

OTHER PUBLICATIONS

International Search Report for Application No. PCT/US2021/023867, mailed on Jan. 4, 2022, 3 pages.
Jaiswal et al., "En-VStegNET: Video Steganography Using Spatio-Temporal Feature Enhancement with 3D-CNN and Hourglass", IEEE 2020 International Joint Conference on Neural Networks, XP033831260, pp. 1-8.
Misbra et al., "VStegNET: Video Steganography Network Using Spatio-Temporal Features and Micro-Bottleneck", 30th British Machine Vision Conference, Sep. 9, 2019, https://bmvc2019.org/wp-content/uploads/papers/0966-paper.pdf, XP055872725, pp. 1-12.
Agilandeeswari et al., "A Robust Color Video Watermarking Scheme Based on Hybrid Embedding Techniques.", Multimedia Tools and Applications, vol. 75, Issue 14, Jul. 2016, pp. 8745-8780.
Ahmadi et al., "Redmark: Framework for Residual Diffusion Watermarking Based on Deep Networks.", arXiv: 1810.072448v1, Oct. 16, 2018, 14 pages.
Arjovsky et al., "Wasserstein GAN.", arXiv: 1701.07875v3, Dec. 6, 2017, 32 pages.
Asikuzzaman et al., "An Overview of Digital Video Watermarking.", Institute of Electrical and Electronics Engineers Transactions on Circuits and Systems for Video Technology, vol. 28, Issue 9, Jun. 2017, pp. 2131-2153.
Asikuzzaman et al., "Robust DT CWT-based Dibr 3D Video Watermarking Using Chrominance Embedding.". Institute of Electrical and Electronics Engineers Transactions on Multimedia, vol. 18, Issue 9, Sep. 2016, pp. 1733-1748.
Bender et al. "Techniques for Data Hiding.". IBM Systems Journal, vol. 35, Issues 3 and 4, Jan. 1996, pp. 313-336.
Campisi et al., "Video Watermarking in the 3D-DWT Domain Using Perceptual Masking.", In Institute of Electrical and Electronics Engineers International Conference on Image Processing, vol. 1, Oct. 2005 pp. I-997-I-1000.
Carreira et al., "A Short Note About Kinetics-600.", arXiv: 1808.01340v1, Aug. 3, 2018, 6 pages.
Carreira et al., "Quo Vadis, Action Recognition? A New Model and the Kinetics Dataset.", Institute of Electrical and Electronics Engineers Conference on Computer Vision and Pattern Recognition, Honolulu, Hawaii, United States, Jul. 21-26, 2017, pp. 6299-6308.
Chan et al., "A DWT-based Digital Video Watermarking Scheme with Error Correcting Code.", In International Conference on Information and Communications Security, Huhehaote, China, Oct. 10-13, 2003, pp. 202-213.
Chopra et al., "LSB Based Digital Image Watermarking for Gray Scale Image.", International Organization of Scientific Research Journal of Computer Engineering, vol. 6, Issue 1, Sep.-Oct. 2012, pp. 36-41.
Chu et al., "Learning Temporal Coherence via Self Supervision for GAN-based Video Generation.", arXiv:1811.09393v4, May 21, 2020, 19 pages.
Coria et al., "A Video Watermarking Scheme Based on the Dual-Tree Complex Wavelet Transform.", Institute of Electrical and Electronics Engineers Transactions on Information Forensics and Security, Sep. 2008, vol. 3, No. 3, pp. 466-474.
Cox et al., "Digital Watermarking.", vol. 53. Springer, 2002, 494 pages.
Cox et al., "Secure Spread Spectrum Watermarking for Multimedia.", Institute of Electrical and Electronics Engineers Transactions on Image Processing, 1997, vol. 6, Issue 12, pp. 1673-1687.

Deguillaume et al. "Robust 3D DFT Video Watermarking.", Security and Watermarking of Multimedia Contents, vol. 3657, Feb. 1999, pp. 113-124.
Dey et al., "DWT-DCT-SVD Based Intravascular Ultrasound Video Watermarking.", World Congress on Information and Communication Technologies Institute of Electrical and Electronics Engineers Conference, Trivandrum, India, Oct. 30-Nov. 2, 2012, pp. 224-229.
Goodfellow et al., "Generative Adversarial Nets", Twenty-eighth Annual Conference on Advances in Neural Information Processing Systems, Montreal, Canada, Dec. 8-13, 2014, pp. 2672-2680.
Hamidi et al., "A Blind Robust Image Watermarking Approach Exploiting the DFT Magnitude.", arXiv:1910.11185v1, Oct. 22, 2019, 6 pages.
Hore et al., "Image Quality Metrics: PSNR vs. SSIM.", Twentieth International Conference on Pattern Recognition, Istanbul, Turkey, Aug. 23-26, 2010, pp. 2366-2369.
International Preliminary Report on Patentability for PCT/US2021/023867, mailed on Oct. 5, 2023, 10 pages.
Katzenbeisser et al., "Digital Watermarking.", Springer, 2000, 494 pages.
Kay et al., "The Kinetics Human Action Video Dataset.", arXiv: 1705.06950v1, May 19, 2017, 22 pages.
Kim et al., "Invariant Image Watermark Using Zernike Moments.", Institute of Electrical and Electronics Engineers Transactions on Circuits and Systems for Video Technology, vol. 13, No. 8, Aug. 2003, pp. 766-775.
Kimpan et al., "Variable Block Size Based Adaptive Watermarking in Spatial Domain.", 2004 Institute of Electrical and Electronics Engineers International Symposium on Communications and Information Technology, Sapporo, Japan, Aug. 4-6, 2004, pp. 374-377.
Kingma et al., "Adam: A Method for Stochastic Optimization.", arXiv:1412.6980v9, Jan. 30, 2017, 15 pages.
Liu et al., "A Novel Two-Stage Separable Deep Learning Framework for Practical Blind Watermarking.", Association for Computing Machinery International Conference on Multimedia, Nice, France, Oct. 21-25, 2019, pp. 1509-1517.
Liu et al., A Robust DWT-based Video Watermarking Algorithm., 2002 Institute of Electrical and Electronics Engineers International Symposium on Circuits and Systems, Phoenix, Arizona, United States, vol. 3, May 26-29, 2002, pp. III-III.
Lucic et al., "Are GANs Created Equal? A Large-Scale Study.", Advances in Neural Information Processing Systems, Montreal, Canada, Dec. 3-8, 2018, pp. 700-709.
Luo et al., "Distortion Agnostic Deep Watermarking.", arXiv.2001.04580v1, Jan. 14, 2020, 15 pages.
Luo et al., "DVMark: A Deep Multiscale Framework for Video Watermarking.", arXiv:2104.12734v1, Apr. 26, 2021, 17 pages.
Masoumi et al., "A Blind Scene-based Watermarking for Video Copyright Protection.", AEU International Journal of Electronics and Communications, vol. 67, Issue 6, Jun. 2013, pp. 528-535.
Mishra et al., "VStegNET: Video Steganography Network Using Spatio-temporal Features and Micro-bottleneck.", The British Machine Vision Conference, Cardiff, United Kingdom, Sep. 9-12, 2019, 12 pages.
Miyato et al., "Spectral Normalization for Generative Adversarial Networks.", Sixth International Conference on Learning Representations, Vancouver, Canada, Apr. 30-May 3, 2018, 26 pages.
O'Ruanaidh et al., "Rotation, Scale and Translation Invariant Digital Image Watermarking.", International Conference on Image Processing, vol. 1, Oct. 26-29, 1997, pp. 536-539.
Patel et al., "A Survey on Digital Video Watermarking.", International Journal of Computer Applications in Technology, vol. 2, Issue 6, 2011, pp. 3015-3018.
Saito et al., "Train Sparsely, Generate Densely: Memory Efficient Unsupervised Training of High-resolution Temporal GAN.", arXiv: 1811.09245v2, Jun. 1, 2020, 22 pages.
Shin et al., "JPEG-resistant Adversarial Images." Thirty-first Conference on Neural Information Processing Systems, Long Beach, California, United States, Dec. 4-9, 2017, 6 pages.
Singh et al., "A Survey of Digital Watermarking Techniques, Applications and Attacks.", International Journal of Engineering and Innovative Technology, vol. 2, Issue 9, Mar. 2013, pp. 165-175.

(56) References Cited

OTHER PUBLICATIONS

Swanson et al., "Multiresolution Scene-Based Video Watermarking Using Perceptual Models.", Institute of Electrical and Electronics Engineers Journal on Selected Areas in Communications, vol. 16, Issue 4, May 1998, pp. 540-550.

Tanaka et al., "Embedding Secret Information into a Dithered Multi-level Image.", Institute of Electrical and Electronics Engineers Military Communications Conference, Monterey, California, United States, Oct. 5-9, 1990, pp. 216-220.

Tancik et al., "StegaStamp: Invisible Hyperlinks in Physical Photographs.", arXiv: 1904.05343v2, Mar. 26, 2020, 13 pages.

Tulyakov et al., "MoCoGAN: Decomposing Motion and Content for Video Generation.", 2018 Institute of Electrical and Electronics Engineers Conference on Computer Vision and Pattern Recognition, Salt Lake City, Utah, United States, Jun. 18-22, 2018, pp. 1526-1535.

Wang et al., "ESRGAN: Enhanced Super-resolution Generative Adversarial Networks.", European Conference on Computer Vision, Munich, Germany, Sep. 8-14, 2018, 16 pages.

Wen et al., "ROMark: A Robust Watermarking System Using Adversarial Training.", arXiv.1910.01221v1, Oct. 2, 2019, 6 pages.

Wengrowski et al., "Light Field Messaging with Deep Photographic Steganography.", 2019 Institute of Electrical and Electronics Engineers Conference on Computer Vision and Pattern Recognition, Long Beach, California, United States, Jun. 16-20, 2019, pp. 1515-1524.

Wiegand et al., "Overview of the H.264/AVC Video Coding Standard.", 2003 Institute of Electrical and Electronics Engineers Transactions on Circuits and Systems for Video Technology, vol. 13, Issue 7, Jul. 2003, pp. 560-576.

Zhang et al., "Robust Invisible Video Watermarking with Attention.", arXiv:1909.01285v1, Sep. 3, 2019, 11 pages.

Zhang et al., "The Unreasonable Effectiveness of Deep Features as a Perceptual Metric.", 2018 Institute of Electrical and Electronics Engineers Conference on Computer Vision and Pattern Recognition, Salt Lake City, Utah, United States, Jun. 18-22, 2018, pp. 586-595.

Zhu et al., "HiDDeN: Hiding Data with Deep Networks.", Fifteenth European Conference on Computer Vision, Munich, Germany, Sep. 8-14, 2018, pp. 657-672.

\* cited by examiner ial-temporal watermark encoding data descriptive of the message vector. The method can include processing, by the computing system, the encoded video data with a decoder portion of a machine-learned watermark decoding model to obtain a first feature encoding and a second feature encoding of the encoded video data, wherein the first feature encoding comprises first spatial-temporal dimensions, and wherein the second feature encoding comprises second spatial-temporal dimensions different than the first spatial-temporal dimensions. The method can include determining, by the computing system, first weighting data and second weighting data with a weighting portion of the machine-learned watermark decoding model, wherein the first weighting data corresponds to the first spatial-temporal dimensions and the second weighting data corresponds to the second spatial-temporal dimensions. The method can include processing, by the computing system, the first feature encoding, the second feature encoding, the first weighting data, and the second weighting data with the machine-learned watermark decoding model to obtain a reconstructed message vector.

MACHINE-LEARNED MODELS FOR IMPERCEPTIBLE MESSAGE WATERMARKING IN VIDEOS

PRIORITY CLAIM

The present application is based upon and claims the right of priority under 35 U.S.C. § 371 to International Application No. PCT/US2021/023867 filed on Mar. 24, 2021, which is incorporated by reference herein.

FIELD

The present disclosure relates generally to watermarking messages within videos. More particularly, the present disclosure relates to training and utilization of machine-learned models for imperceptible message watermarking within video data.

BACKGROUND

Watermarking is generally defined as the embedding of messages within a cover media (e.g., images, video data, audio, etc.). For video data distributed to consumers, it is highly advantageous to apply watermarking imperceptibly. As an example, it is advantageous to apply watermarks imperceptibly to video data so that portions of the video data are not obfuscated by the watermarking data for end users. As another example, watermarks that are applied imperceptibly are substantially more difficult to detect and obfuscate, therefore protecting the watermarking data from attackers (e.g., piracy organizations, etc.).

SUMMARY

Aspects and advantages of embodiments of the present disclosure will be set forth in part in the following description, or can be learned from the description, or can be learned through practice of the embodiments One example aspect of the present disclosure is directed to a computing system for generating a watermark message embedding in video data. The computing system can include one or more processors. The computing system can include one or more tangible, non-transitory computer readable media storing computer-readable instructions that when executed by the one or more processors cause the one or more processors to perform operations. The operations can include obtaining a message vector and video data comprising a plurality of video frames. The operations can include processing the input video with a transformation portion of a machine-learned watermark encoding model to obtain a three-dimensional feature encoding of the input video. The operations can include processing the three-dimensional feature encoding of the input video and the message vector with an embedding portion of the machine-learned watermark encoding model to obtain spatial-temporal watermark encoding data descriptive of the message vector. The operations can include generating encoded video data comprising a plurality of encoded video frames, wherein at least one of the plurality of encoded video frames includes the spatial-temporal watermark encoding data.

Another example aspect of the present disclosure is directed to a computer-implemented method for decoding imperceptibly watermarked encoded video data. The method can include obtaining, by a computing system comprising one or more computing devices, a message vector and video data comprising a plurality of video frames. The method can include processing, by the computing system, the message vector and the video data with a machine-learned watermark encoding model to obtain encoded video data comprising a plurality of encoded video frames, wherein one or more of the plurality of encoded video frames comprises spatial-temporal watermark encoding data descriptive of the message vector. The method can include processing, by the computing system, the encoded video data with a decoder portion of a machine-learned watermark decoding model to obtain a first feature encoding and a second feature encoding of the encoded video data, wherein the first feature encoding comprises first spatial-temporal dimensions, and wherein the second feature encoding comprises second spatial-temporal dimensions different than the first spatial-temporal dimensions. The method can include determining, by the computing system, first weighting data and second weighting data with a weighting portion of the machine-learned watermark decoding model, wherein the first weighting data corresponds to the first spatial-temporal dimensions and the second weighting data corresponds to the second spatial-temporal dimensions. The method can include processing, by the computing system, the first feature encoding, the second feature encoding, the first weighting data, and the second weighting data with the machine-learned watermark decoding model to obtain a reconstructed message vector.

Another example aspect of the present disclosure is directed to one or more tangible, non-transitory computer readable media storing computer-readable instructions that when executed by one or more processors cause the one or more processors to perform operations. The operations can include obtaining a message vector and video data comprising a plurality of video frames. The operations can include processing the message vector and the video data with a machine-learned watermark encoding model to obtain encoded video data comprising a plurality of encoded video frames, wherein at least one of the plurality of encoded video frames comprises spatial-temporal watermark encoding data descriptive of the message vector. The operations can include processing the encoded video data with a machine-learned discriminator model to obtain a discriminator output that indicates whether the encoded video data includes the spatial-temporal watermark encoding data. The operations can include processing the encoded video data with a machine-learned watermark decoding model to obtain decoded video data and a reconstructed message vector. The operations can include evaluating a loss function that evaluates at least one of: the discriminator output, a difference between the decoded video data and the video data, or a difference between the message vector and the reconstructed message vector. The operations can include adjusting, based at least in part on the loss function, one or more parameters of at least one of the machine-learned watermark encoding model, the machine-learned watermark decoding model, or the machine-learned discriminator model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
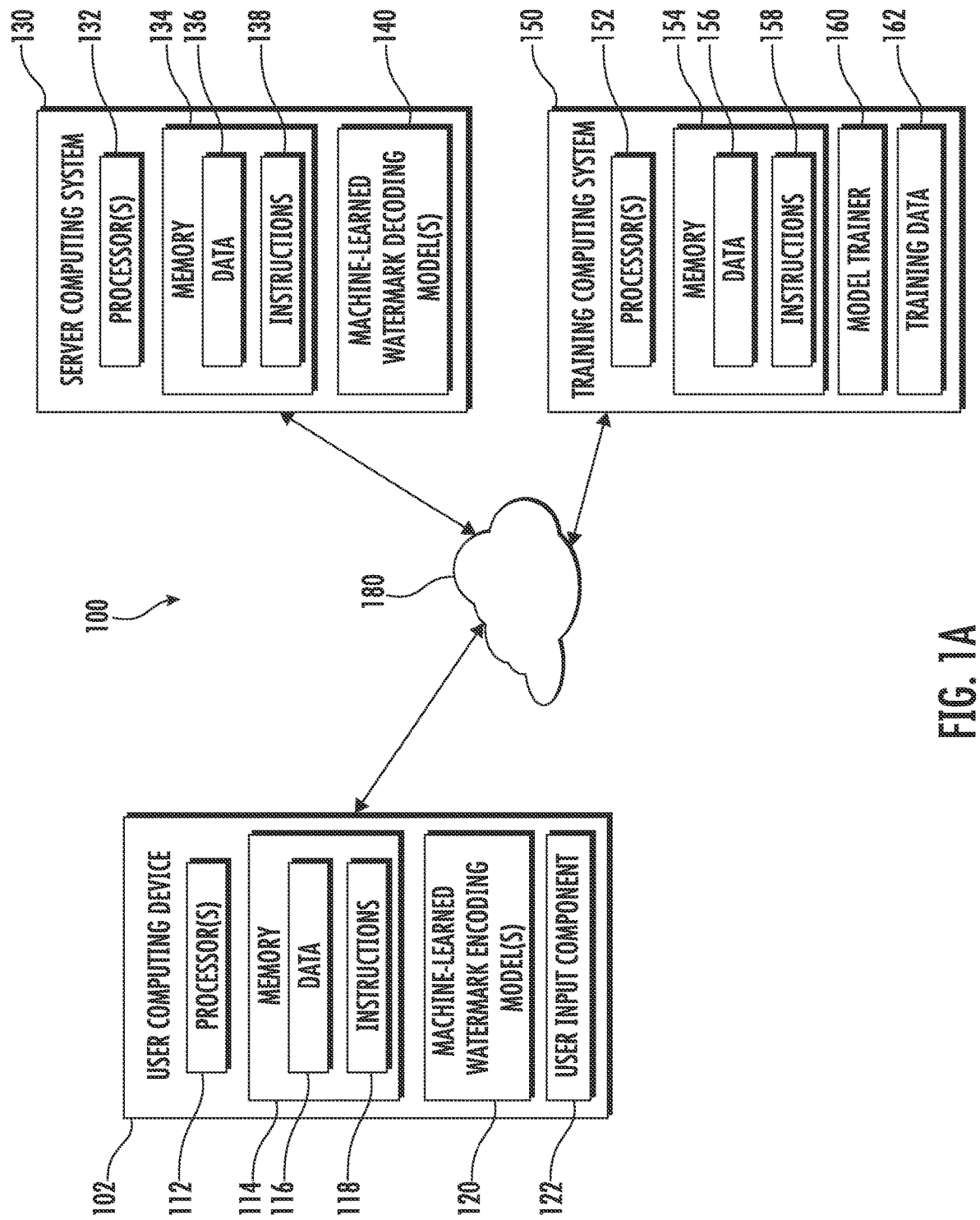
FIG. 1A depicts a block diagram of an example computing system that performs machine-learned watermark encoding according to example embodiments of the present disclosure.

Reference numerals that are repeated across plural figures are intended to identify the same features in various implementations.

DETAILED DESCRIPTION

Overview

Generally, the present disclosure is directed to watermarking messages within videos. More particularly, the present disclosure relates to training and utilization of machine-learned models for imperceptible message watermarking within video data. As an example, a message vector and video data including a plurality of video frames can be obtained. The message vector and the video data can be processed using a machine-learned watermark encoding model to obtain encoded video data that includes spatial-temporal watermark encoding data (e.g., positioned spatially and temporally in the frame(s) of the encoded video data, etc.). The spatial-temporal watermark encoding data can be imperceptible or nearly-imperceptible within the encoded video data, and can describe the message vector. The encoded video data and the video data can then be processed using a machine-learned discriminator model to obtain a discriminator output. The discriminator output can be configured to indicate whether the encoded video data includes the spatial-temporal watermark encoding data.

Additionally, the encoded video data can be processed using a machine-learned watermark decoding model to obtain decoded video data and a reconstructed message vector. A loss function can evaluate the discriminator output, the decoded video data, and the reconstructed message vector. Finally, parameter(s) of the machine-learned watermark encoding model and/or any other model can be adjusted based on the loss function. In such fashion, the machine-learned watermark encoding model can be trained to generate spatial-temporal watermark encoding data in an imperceptible manner while also preserving the contents of the message vector.

More particularly, a message vector can be obtained alongside video data. The message vector can be any sort or type of vector that encodes a message. As an example, the message vector can include a plaintext message. As another example, the message vector can describe property rights information (e.g., copyright information, an identity of a device associated with playback or copying of the video data, etc.). As yet another example, the message vector can include data lost from previous encoding of the video data (e.g., data lost from encoding the video data using a lossy encoding scheme, etc.). As yet another example, the message vector can include a unique signifier associated with a creator or rights owner of the video data (e.g., a unique cryptographic identifier associated with the creator or rights owner, etc.). Additionally, the video data can be or otherwise include a plurality of video frames. In some implementations, the video data can be encoded using any conventional or machine-learned encoding scheme (e.g., HEVC/H, H. 264, MPEG-4, MP4, AVI, etc.).

Based at least in part on the video data, one or more three-dimensional feature encodings can be determined. In some implementations, each of the one or more three-dimensional feature encodings can be or otherwise represent the features of the video data encoded at a certain spatial-temporal scale. As an example, the machine-learned watermark encoding model can include a transformation portion. The transformation portion can process the video data to determine a plurality of three-dimensional feature encodings. Each of the plurality of three-dimensional feature encodings can be encoded at a specific spatial-temporal scale (e.g., one or more spatial-temporal dimensions, etc.). For example, a first three-dimensional feature encoding can be encoded one or more first spatial-temporal dimensions, and a second three-dimensional feature encoding can be encoded at one or more second spatial-temporal dimensions different than the first spatial-temporal dimensions.

The one or more three-dimensional feature encodings and the message vector can be processed with an embedding portion of the machine-learned watermark encoding model to obtain spatial-temporal watermark encoding data. The spatial-temporal watermark encoding data can be descriptive of the message vector or can otherwise describe the data included in the message vector. As an example, the spatial-temporal watermark encoding data can be describe a number of adjustments to one or more frames of the video data that are configured to represent the message vector (e.g., slight adjustments to various properties of the video frame(s) (e.g., pixel value(s), etc.), etc.).

In some implementations, the three-dimensional feature encoding can include one or more spatial-temporal dimensions. The message vector can be processed with an embedding portion of the machine-learned watermark encoding model to obtain a three-dimensional message encoding that corresponds to the one or more spatial-temporal dimensions. In some implementations, the three-dimensional message encoding and the three-dimensional feature encoding can be processed with the embedding portion of the machine-learned watermark encoding model to obtain a three-dimensional fused encoding. The three-dimensional fused encoding can be processed using the embedding portion of the machine-learned watermark encoding model to obtain the spatial-temporal watermark encoding data descriptive of the message vector.

In some implementations, to process the three-dimensional fused encoding, the three-dimensional feature encoding of the input video can be scaled to obtain a scaled three-dimensional feature encoding that includes one or more scaled spatial-temporal dimensions. The message vector can be processed with the embedding portion of the machine-learned watermark encoding model to obtain a scaled three-dimensional message encoding corresponding to the one or more scaled spatial-temporal dimensions. The scaled three-dimensional message encoding and the scaled three-dimensional feature encoding can be processed with the embedding portion of the machine-learned watermark encoding model to obtain a three-dimensional scaled encoding. Thus, in such fashion, the three-dimensional fused encoding and the three-dimensional scaled encoding can be processed with the embedding portion of the machine-learned watermark encoding model to obtain the spatial-temporal watermark encoding data descriptive of the message vector.

After obtaining the spatial-temporal watermark encoding data, encoded video data can be generated that includes a plurality of encoded video frames. At least one of the encoded video frames can include the spatial-temporal watermark encoding data. As an example, the embedding portion of the machine-learned watermark encoding model can process the three-dimensional feature encoding(s) and the message vector to obtain the spatial-temporal watermark encoding data, which can be a predicted residual. This predicted residual can be added to one or more video frames of the video data to generate the encoded video data and the one or more encoded video frames that include the spatial-temporal watermark data. Alternatively, in some implementations, the embedding portion of the machine-learned watermark encoding model can process the three-dimensional feature encoding(s) and the message vector to obtain the encoded video data with encoded video frame(s) that include the spatial-temporal watermark encoding data.

The encoded video data can be processed using a machine-learned discriminator model to obtain a discriminator output. The discriminator output can be configured to indicate whether or not the encoded video data includes the spatial-temporal watermark encoding data. More particularly, the discriminator output will indicate that the encoded video data either includes the spatial-temporal watermarking data or that the encoded video data does not include the spatial-temporal watermarking data.

In some implementations, the machine-learned discriminator model can process both the video data and the encoded video data to determine which of the two data files includes the spatial-temporal watermarking data. More particularly, the machine-learned discriminator model can indicate that the encoded video data includes the spatial-temporal watermarking data, or that the video data includes the spatial-temporal watermarking data, but cannot indicate that both or neither include the spatial-temporal watermarking data. In such fashion, the discriminator output can be evaluated using a loss function to train the machine-learned watermark encoding model to reduce and/or eliminate the perceptibility of the spatial-temporal watermark encoding data.

The encoded video data can be processed with a machine-learned watermark decoding model to obtain a reconstructed message vector. The reconstructed message vector can be identical or substantially similar to the message vector, and can include the message encoded within the message vector. Additionally, in some implementations, decoded video data can also be obtained alongside the reconstructed message vector. Similarly, the decoded video data can be identical or substantially similar to the video data.

More particularly, the encoded video data can be processed with a decoder portion of the machine-learned watermark decoding model to obtain a first feature encoding and a second feature encoding of the encoded video data. The first feature encoding can include first spatial-temporal dimensions, and the second feature encoding can include second spatial-temporal dimensions different than the first spatial temporal dimensions. Using a weighting portion of the machine-learned watermark decoding model, first weighting data and second weighting data can be determined (e.g., a weight vector, a weight tensor, etc.). The first weighting data can correspond to the first spatial-temporal dimensions of the first feature encoding, and the second weighting data can correspond to the second spatial-temporal dimensions of the second feature encoding. As an example, the first feature encoding can be a three-dimensional feature encoding of the encoded video data at a first scale (e.g., the first spatial-temporal dimensions, etc.). The weighting data can be or otherwise include a three-dimensional weight tensor with the same spatial-temporal dimensions as the first feature encoding. In such fashion, the weighting data can be applied to the feature encoding directly.

The first feature encoding, the second feature encoding, the first weighting data, and the second weighting data can be processed with the machine-learned watermark decoding model to obtain a reconstructed message vector. The reconstructed message vector can be identical or substantially similar to the message vector. In some implementations, prior to processing the encoded video data with the decoder portion of the machine-learned watermark decoding model, the encoded video data can be processed with a transformation portion of the machine-learned watermark decoding model to obtain a feature mapping of the encoded video data. This feature mapping can be processed with the decoder portion of the machine-learned watermark decoding model to obtain the first feature encoding and the second feature encoding of the encoded video data.

In some implementations, prior to processing the feature mapping of the encoded video data with the decoder portion of the machine-learned watermark decoding model, the feature mapping of the encoded video data can be processed with a detector portion of the machine-learned watermark decoding model to obtain a detector output. The detector output can be configured to indicate, for each of the plurality of encoded video frames, whether a respective encoded video frame comprises the spatial-temporal watermark encoding data descriptive of the message vector. In some implementations, processing the feature mapping of the encoded video data with the decoder portion of the machine-learned watermark decoding model can be based at least in part on the detector output.

In some implementations, prior to processing the encoded video data with the machine-learned watermark decoding model, the encoded video data can be processed with a machine-learned video distortion model to apply one or more distortions to the encoded video data. More particularly, the machine-learned video distortion model can be configured to apply distortions identical or substantially similar to those distortions seen in various video-data use cases (e.g., transmission loss distortion, compression distortion, etc.) in a differentiable fashion.

As an example, some lossy codecs can cause non-differentiable compression effects when utilized to encode video data. The one or more distortions can include a compression effect (e.g., a differentiable effect configured to emulate the compression distortion caused by common video compression schemes, etc.). As another example, the one or more distortions can include dropping at least one of the encoded video frame(s). As another example, the one or more distortions can include swapping a first encoded video frame with a second encoded video frame temporally within the encoded video data. As another example, the one or more distortions can include any adjustment to pixel data of one or more of the encoded video frames (e.g., a blur effect, a noise effect, a color jitter effect, a cropping effect, etc.). In such fashion, the generation of the encoded video data (e.g., application of the spatial-temporal watermark encoding data to the video data, etc.), can be made more robust to distortions caused by real-world video data use cases.

A loss function can be evaluated. The loss function can evaluate one or more of the discriminator output, a difference between the decoded video data and the video data, or a difference between the message vector and the reconstructed message vector. Based at least in part on the loss function, one or more parameters of at least one of the previously described model(s) can be adjusted. As an example, based at least in part on the loss function, parameter(s) of at least one of the machine-learned watermark encoding model, the machine-learned watermark decoding model, the machine-learned video distortion model, or the machine-learned discriminator model can be adjusted. It should be understood that in some implementations, the parameter(s) of only some of these models may be adjusted. As an example, parameter(s) of the machine-learned discriminator model may be adjusted for a number of training iterations and then frozen while the parameter(s) of other models are adjusted over a number of subsequent training iterations. As another example, parameter(s) of the machine-learned video distortion model may be adjusted for a number of training iterations and then frozen while the parameter(s) of other models are adjusted over a number of subsequent training iterations. In such fashion, each of the previously described models can be trained in an end-to-end fashion.

Systems and methods of the present disclosure provide a number of technical effects and benefits. As one example technical effect and benefit, video watermarking has generally been utilized to prevent the unauthorized copying and distribution of video data (e.g., movies, television shows, etc.). However, perceptible watermarking can negatively affect the experience of end users. As such, for video data distributed to users, it is highly advantageous to apply watermarking imperceptibly. As an example, by incorporating a machine-learned video discriminator model, systems and methods of the present disclosure more efficiently train the machine-learned watermark encoding model to generate watermarks, therefore reducing or eliminating the perceptibility of the watermarking included in the video data. As another example, watermarks that are applied imperceptibly are substantially more difficult to detect and obfuscate, therefore protecting the cover media from attackers (e.g., piracy organizations, etc.). As such, the systems and methods of the present disclosure, which allow for the training and utilization of machine-learned models for imperceptible watermarking, significantly reduce or eliminate any negative effects of watermarking to end users.

With reference now to the Figures, example embodiments of the present disclosure will be discussed in further detail.

Example Devices and Systems

FIG. 1A depicts a block diagram of an example computing system 100 that performs machine-learned watermark encoding according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned watermark encoding models 120. For example, the machine-learned watermark encoding models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned watermark encoding models 120 are discussed with reference to FIGS. 2-6.

In some implementations, the one or more machine-learned watermark encoding models 120 can be received from the server computing system 130 over network 180, stored in the user computing device memory 114, and then used or otherwise implemented by the one or more processors 112. In some implementations, the user computing device 102 can implement multiple parallel instances of a single machine-learned watermark encoding model 120 (e.g., to perform parallel watermark encoding across multiple instances of the machine-learned watermark encoding model).

More particularly, a message vector and video data including a plurality of video frames can be obtained by the user computing device 102 (e.g., via network(s) 180, etc.). The message vector and the video data can be processed using the machine-learned watermark encoding model 120 to obtain encoded video data that includes a spatial-temporal watermark encoding data (e.g., positioned spatially and temporally in the frame(s) of the encoded video data, etc.). The spatial-temporal watermark encoding data can be imperceptible or nearly-imperceptible within the encoded video data, and can describe the message vector.

Additionally or alternatively, one or more machine-learned watermark decoding models 140 can be included in or otherwise stored and implemented by the server computing system 130 that communicates with the user computing device 102 according to a client-server relationship. For example, the machine-learned watermark decoding models 140 can be implemented by the server computing system 130 as a portion of a web service (e.g., a content distribution service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned watermark decoding models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-6.

More particularly, the server computing system 130 can obtain the encoded video data generated at the user computing device 102 using the machine-learned watermark encoding model 120 as previously described (e.g., via network(s) 180, etc.). The machine-learned watermark decoding model(s) 140 can process the encoded video data to obtain a reconstructed message vector and decoded video data. In such fashion, video data can be encoded with spatial-temporal watermarking data descriptive of a message vector at one computing device/system (e.g., user computing device 102, server computing system 130, etc.) using a machine-learned watermark encoding model (e.g., machine-learned watermark encoding model 120, etc.), and can decoded at a separate computing device/system (e.g., user computing device 102, server computing system 130, etc.) using a machine-learned watermark decoding model (e.g., machine-learned watermark decoding model 140, etc.).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

More particularly, in some implementations, model trainer 160 can additionally include a number of machine-learned models. As an example, the model trainer 160 can include a machine-learned video distortion model. The machine-learned video distortion model can be configured to distort video data so that the model trainer 160 can more efficiently train the models 120/140 to be more robust to distortions typical to video data use-cases (e.g., as previously described, etc.). As another example, the model trainer 160 can include a machine-learned discriminator model. The machine-learned video distortion model can be configured to produce a discriminator output indicative of whether the encoded video data includes spatial-temporal watermarking data so that the model trainer 160 can more efficiently train the model 120 to more imperceptibly apply watermarking data to video data.

In particular, the model trainer 160 can train the models 120 and/or 140 based on a set of training data 162. The training data 162 can include, for example, video data and associated ground truth data. For example, the associated ground truth data can indicate whether the video data includes spatial-temporal watermarking data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
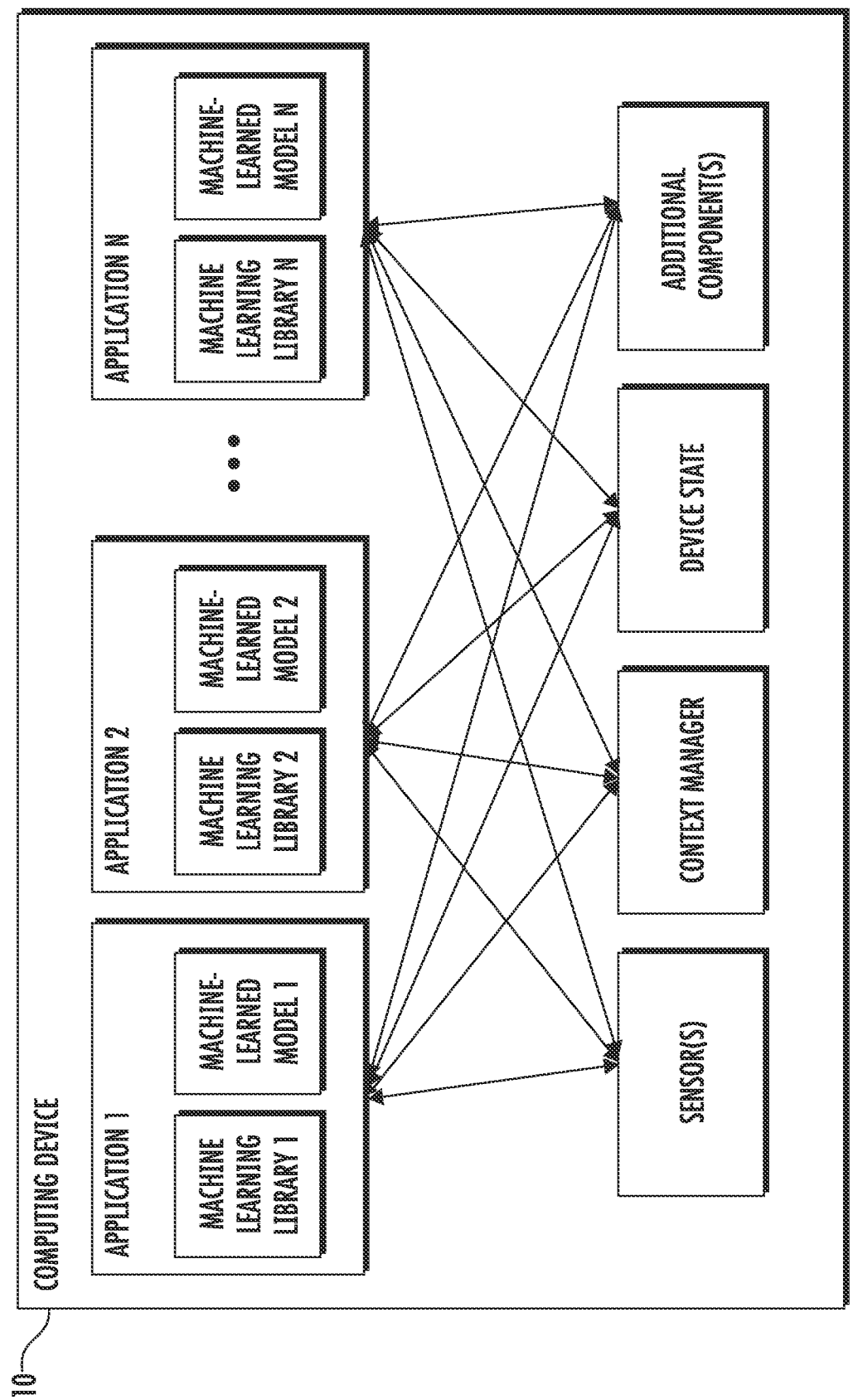
FIG. 1B depicts a block diagram of an example computing device that performs imperceptible watermark encoding according to example embodiments of the present disclosure.

FIG. 1B depicts a block diagram of an example computing device 10 that performs imperceptible watermark encoding according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
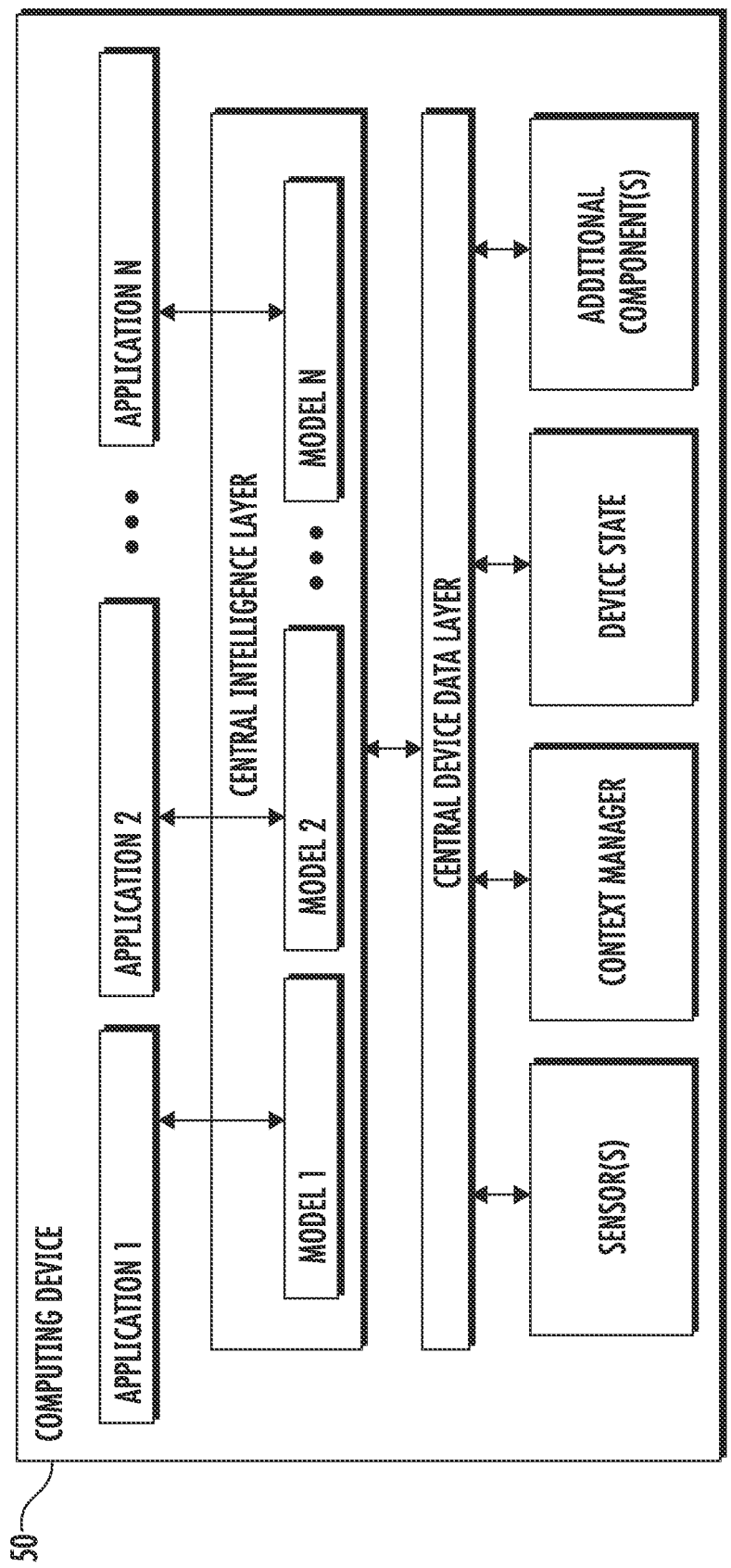
FIG. 1C depicts a block diagram of an example computing device that performs end-to-end training of a machine-learned generative adversarial network for generation of imperceptible spatial-temporal watermarking according to example embodiments of the present disclosure.

FIG. 1C depicts a block diagram of an example computing device 50 that performs end-to-end training of a machine-learned generative adversarial network for generation of imperceptible spatial-temporal watermarking according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
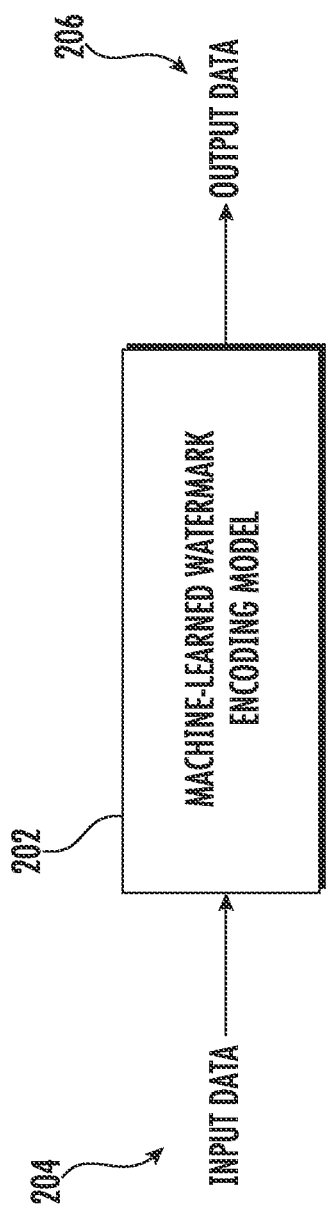
FIG. 2 depicts a block diagram of an example machine-learned watermark encoding model according to example embodiments of the present disclosure.

FIG. 2 depicts a block diagram of an example machine-learned watermark encoding model 202 according to example embodiments of the present disclosure. In some implementations, the machine-learned watermark encoding model 202 is trained to receive a set of input data 204 descriptive of video data and a message vector and, as a result of receipt of the input data 204, provide output data 206 which can include encoded video data in which the message vector is encoded imperceptibly using a watermark.

As a more particular example, the input data 204 can include a message vector and video data including a plurality of video frames can be obtained. The input data 204 including the message vector and the video data can be processed using the machine-learned watermark encoding model 202 to obtain the output data 206. The output data 206 can include encoded video data that includes spatial-temporal watermark encoding data (e.g., positioned spatially and temporally in the frame(s) of the encoded video data, etc.). The spatial-temporal watermark encoding data can be imperceptible or nearly-imperceptible within the encoded video data, and can describe the message vector.

Figure 3:
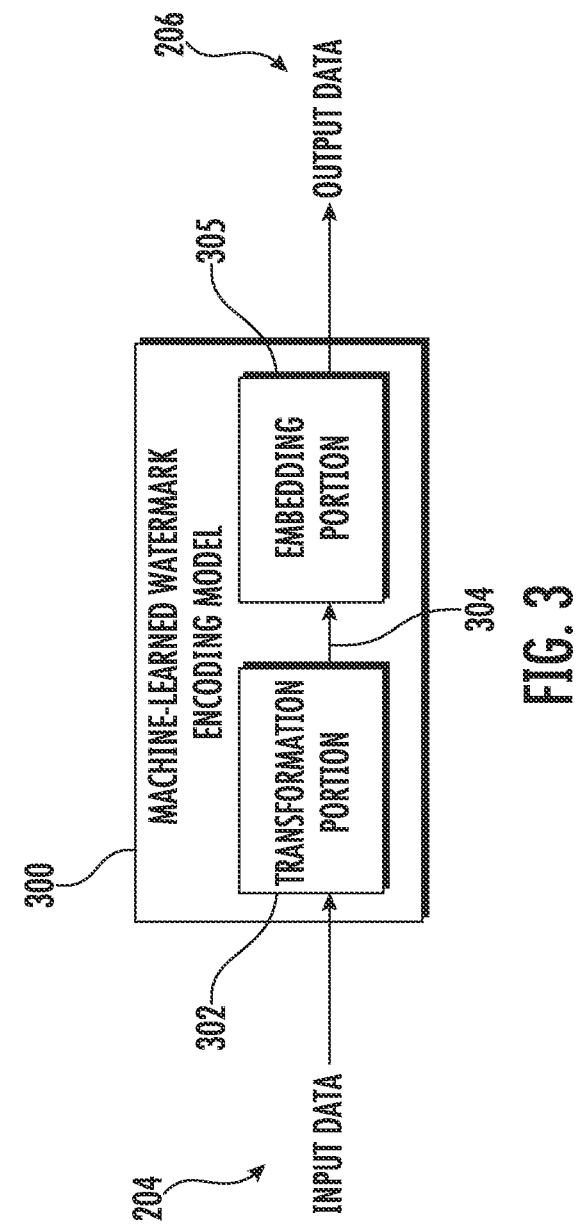
FIG. 3 depicts a block diagram of an example machine-learned watermark encoding model according to example embodiments of the present disclosure.

FIG. 3 depicts a block diagram of an example machine-learned watermark encoding model 300 according to example embodiments of the present disclosure. The machine-learned watermark encoding model 300 is similar to machine-learned watermark encoding model 200 of FIG. 2 except that machine-learned watermark encoding model 300 further includes transformation portion 302 and embedding portion 305.

More particularly, the transformation portion 302 of the machine-learned watermark encoding model 300 can be configured to process the video data included in the input data 204 to obtain one or more three-dimensional feature encodings of the input video 304. The one or more three-dimensional feature encodings of the input video 304 can be processed alongside the message vector with an embedding portion 305 of the machine-learned watermark encoding model 300 to obtain output data 306. The output data 306 can include spatial-temporal watermark encoding data. The spatial-temporal watermark encoding data 306 can be descriptive of the message vector of the input data 204 or can otherwise describe the data included in the message vector. As an example, the spatial-temporal watermark encoding data 306 can describe a number of adjustments to one or more frames of the video data that are configured to represent the message vector (e.g., slight adjustments to various properties of the video frame(s) (e.g., pixel value(s), etc.), etc.).

Figure 4:
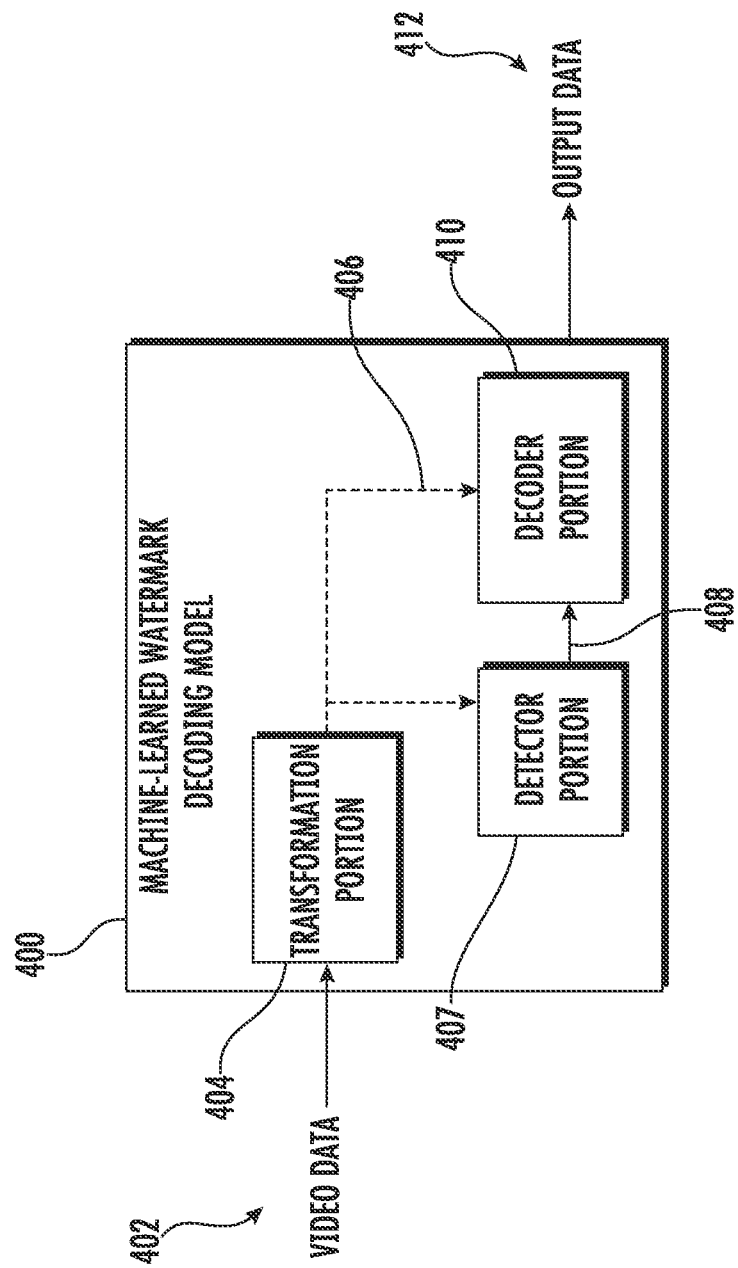
FIG. 4 depicts a block diagram of an example machine-learned watermark decoding model 400 according to example embodiments of the present disclosure.

FIG. 4 depicts a block diagram of an example machine-learned watermark decoding model 400 according to example embodiments of the present disclosure. More particularly, the input data 402 can include encoded video data as included in the output data of FIGS. 2 and 3. The transformation portion 404 can process the encoded video data included in the input data 402 to obtain a feature mapping 406. The feature mapping 406 can be processed with a detector portion 407 of the machine-learned watermark decoding model 400 to obtain a detector output 408. The detector output 408 can be configured to indicate, for each of the plurality of frames of the encoded video data included in the input data 402, whether a respective encoded video frame comprises the spatial-temporal watermark encoding data descriptive of the message vector.

The detector output 408, alongside the feature mapping 406, can be processed with the decoder portion 410 of the machine-learned watermark decoding model 400. In some implementations, the decoder portion 410 can include a plurality of decoder heads. As an example, a first decoder head of the decoder portion 410 can process the feature mapping 406 to obtain a first feature encoding included in the output data 412. A second decoder head of the decoder portion 410 can process the feature mapping 406 to obtain a second feature encoding included in the output data 412. In such fashion, the decoder portion 410 of the machine-learned watermark decoding model 400 can utilize a multi-headed architecture to process the feature mapping and detector output to generate feature encoding(s) at different spatial-temporal scales.

Figure 5:
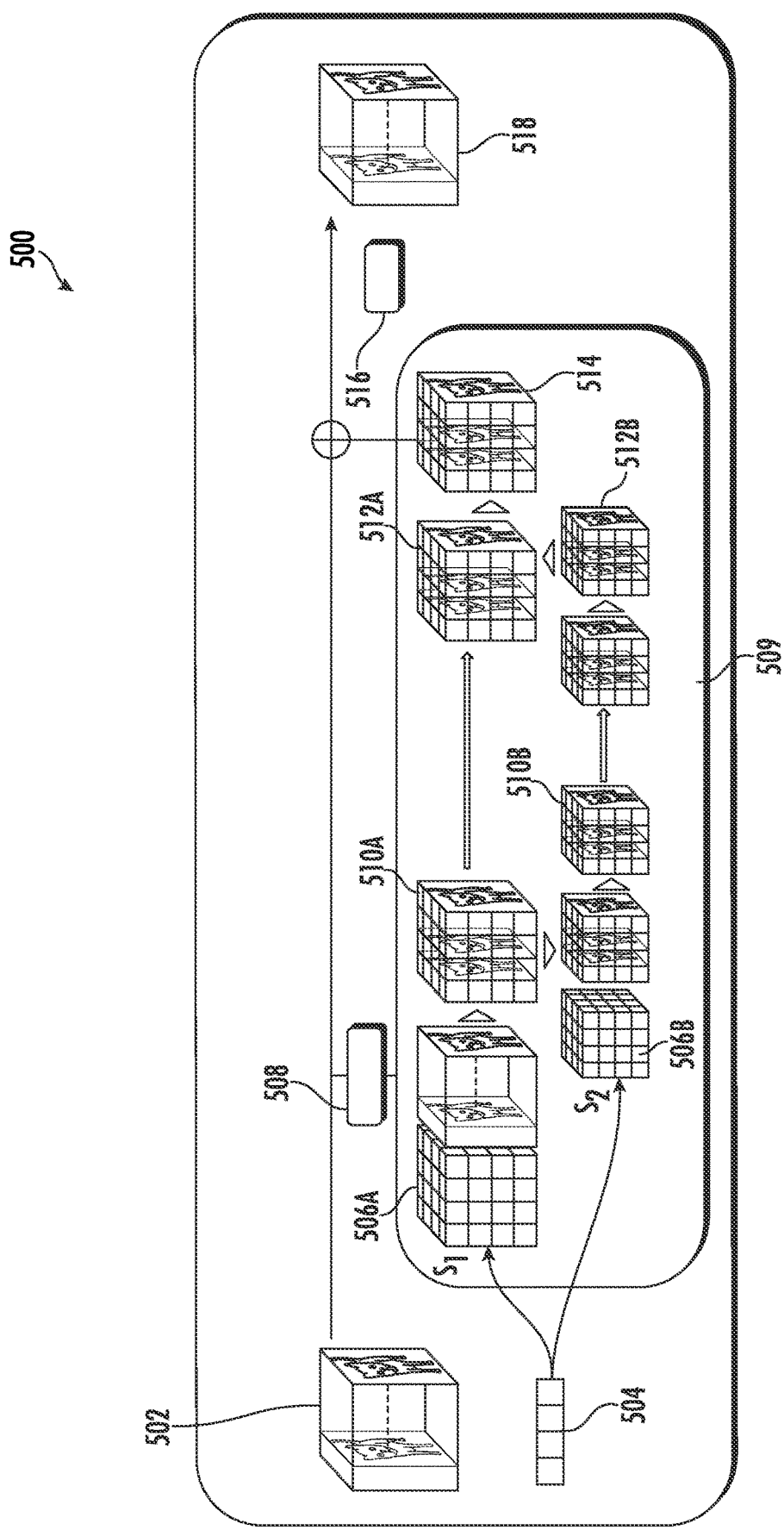
FIG. 5 depicts a data flow diagram of an example machine-learned watermark encoding model according to example embodiments of the present disclosure.

FIG. 5 depicts a data flow diagram 500 of an example machine-learned watermark encoding model according to example embodiments of the present disclosure. As depicted, the machine-learned watermark encoding model can include two main components: the message transformation portion 508 and the embedding portion 509. The transformation portion 508 can be configured to process the video data 502 to obtain a three-dimensional feature encoding 510A of the feature video. Additionally, in some implementations, the three-dimensional feature encoding 510A can be scaled to generate scaled three-dimensional feature encoding 510B.

As a more particular example, the transformation portion 508 can be or otherwise include 4 layers of 3D convolutions which can transforms the video data 502 to a 3D feature block 510A with the same dimensions. Each layer can include 64 output channels, with stride equal 1, spatial kernel size equal 3, and temporal kernel size equal to 1, 1, 1, 3 respectively. For example, the design of the transformation portion 508 can be differentiated from conventional watermarking methods in the frequency-domain where the messages are embedded onto a transformed domain instead of directly on the pixel domain. The transformation portion 508 can thus enable an optimal transformation to be learned, prior to merging with the embedded messages.

The message 504 vector can be processed alongside the three-dimensional feature encoding 510A with the embedding portion 509 to obtain spatial-temporal watermark encoding data 514. More particularly, the embedding portion 509 can fuse the input message vector 504 M with the three-dimensional feature encoding 510A at two scale levels—scale 506A $S_1$ and scale 506B $S_2$. As an example, the three-dimensional feature encoding 510A can include spatial-temporal dimension(s) at a first scale. The message vector 504 can be scaled to the scale of the three-dimensional feature encoding 510A to obtain scaled message encoding 506A that corresponds to the first spatial-temporal dimensions. Similarly, the three-dimensional feature encoding 510B can include spatial-temporal dimension(s) at a second scale. The message vector 504 can be scaled to the scale of the three-dimensional feature encoding 510B to obtain scaled message encoding 506B that corresponds to the second spatial-temporal dimensions. The message vector 504 can be first repeated along both spatial and temporal dimensions to the same size as each three-dimensional feature encoding 510A/510B, and can be concatenated with the feature map(s) three-dimensional feature encoding 510A/510B along the channel dimension to obtain three-dimensional fused encoding 510A. Similarly, scaled message encoding 504 can be concatenated with three-dimensional feature encoding 510B to obtain three-dimensional fused encoding 512B. For example, if the three-dimensional feature encoding 510A/510B is or otherwise includes a tensor of shape T×H×W×C, the scaled message encoding 506A/506B has shape T×H×W×m, with m being the message length.

To follow the previous example, three Conv3D operations with kernel size 3 and number of channels 256, 128, 128 can be applied to merge the scaled message embeddings 506A/506B with the three-dimensional feature encoding(s) 510A/510B. It should be noted that the three-dimensional feature encoding 510B can be generated by scaling the three-dimensional feature encoding 510A. For example, an AvgPool3D operation can be applied with stride 2 to perform a 2× downsampling of the three-dimensional feature encoding 510A from $S_1$ to $S_2$, therefore generating the three-dimensional feature encoding 510B. In some implementations, three Conv3D operations can be applied to the three-dimensional fused encoding 512B with channels 512, 256, 256 before upsampling through bilinear interpolation and merging with the three-dimensional fused encoding 512A at scale $S_1$ to obtain the spatial-temporal watermark encoding data 514.

Following the weighting of the message vector, the embedding portion 509 can process the concatenation of the three-dimensional feature encodings 510A/510B and the scaled message embeddings 506A/506B. The embedding portion 509 can apply its multiscale architecture, where three layers of 3D convolutions are applied followed by a downsampling operation. More particularly, the embedding portion 509 can learn to predict a residual (e.g., spatial-temporal watermark encoding data 514). To do so, the embedding portion 509 can fuse the three-dimensional feature encodings 510A/510B with the scaled message embeddings 506A/506B.

It should be noted that the generation of the encoded video data 518 can be based at least in part on an adjustable scaling factor 516 configured to control the perceptibility of the spatial-temporal watermarking data 514 as it is applied to the video data 502. More particularly, the degree of perceptibility of the spatial-temporal watermarking data 514 as applied to the cover video 502 can be controlled by the adjustable scaling factor 516. As an example, as the adjustable scaling factor 516 is increased, the perceptibility of the spatial-temporal watermarking data 514 included in the encoded video data 518 will increase, and vice-versa.

Figure 6:
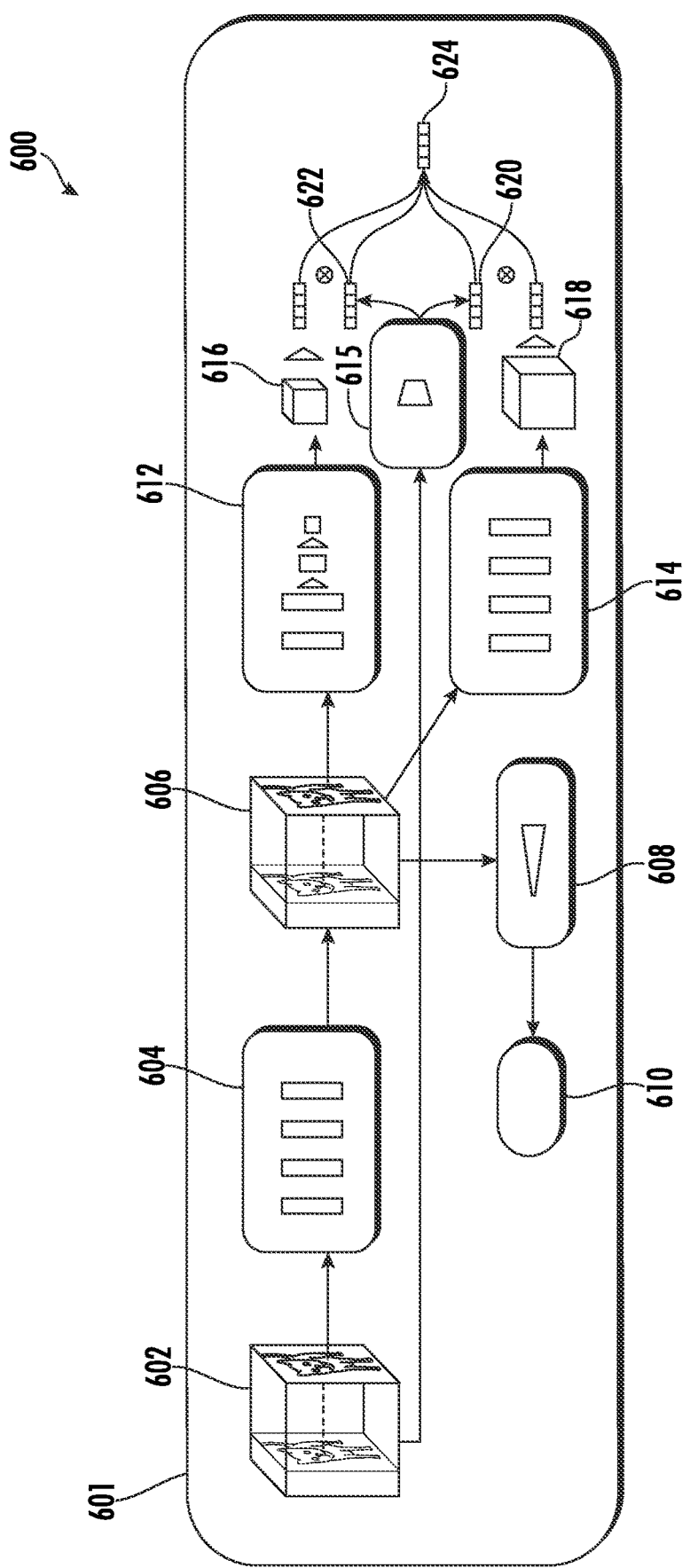
FIG. 6 depicts a data flow diagram of an example machine-learned watermark decoding model 601 according to example embodiments of the present disclosure.

FIG. 6 depicts a data flow diagram 600 of an example machine-learned watermark decoding model 601 according to example embodiments of the present disclosure. As depicted, the machine-learned watermark decoding model 601 can include a number of main components: the transformation portion 605, the detector portion 608, and the decoder heads 612 and 614 of the decoder portion. The machine-learned watermark decoding model 601 takes a possibly distorted version of the encoded video data 602 $V_d$, and outputs a reconstructed message vector 624 $M^w$. Similar to the machine-learned watermark encoding model, the machine-learned watermark decoding model 601 can also incorporate a multiscale component through a multi-head design (e.g., decoder heads 612 and 614). Additionally, a per-video scalar weight can be predicted to each predicted bits of both decoder heads 612/614, so that the distribution strategy across different scales can be content-adaptive. The weights are learned through a weighting portion 615 of the machine-learned watermark decoding model 601. Furthermore, the machine-learned watermark decoding model 601 can include an additional decoder portion 608 for the purpose of detecting whether each frame of the encoded video data 602 includes the spatial-temporal watermark data. It should be noted that the decoder portion 608 of the machine-learned watermark decoding model 601 can serve an important function. Detection of whether an individual frame of the encoded video data 602 includes the spatial-temporal watermarking data can be as important task a extracting the reconstructed message vector 624 itself.

More particularly, the encoded video data 602 can be processed with the transformation portion 604 of the machine-learned watermark decoding model 601 to obtain a feature mapping 606 of the encoded video data 602. As an example, the transformation portion 604 can be first applied to map the distorted encoded video data 602 $V_d$ to the feature mapping 606 $D_f$, which can in turn be processed by both the detector portion 608 and the decoder heads 612/614. For example, four Conv3D operations can be applied in a manner identical or substantially similar to that discussed in regards to the encoder transformation layer to extract the feature mapping 606. It should be noted that unlike conventional frequency-based methods, where the decoder portion of a model will usually apply the same frequency transforms as the encoder, the systems and methods of the present disclosure facilitate the flexibility of learning different transformations for the machine-learned watermark decoding model 601.

The feature mapping 606 can be processed with the detector portion 608 to obtain a detector output 610. More particularly, the detector portion 608 can generate the detector output 610, which can be configured to indicate whether frame of the encoded video data 602 includes the spatial-temporal watermark data. It should be noted that the feature mapping 606 that is obtained from the transformation portion 604 can, in some implementations, be re-used to differentiate between watermarked and unwatermarked video frames of the encoded video data 602. As such, the detector portion 608 can be trained to generate a detector output 610 that is configured to differentiate watermarked frames from unwatermarked frames under the presence of various distortions. In some implementations, the detector portion 610 can include four Conv2D$_{3,3}$ operations (e.g., where the output channels are 128, 128, 256, 512 respectively, etc.). In some implementations, by using only spatial information, the detector portion 610 can be applied independently for each frame of the encoded video data 602, which in turn can increase the temporal granularity for locating watermarked frames within a longer video that has only been partially watermarked.

The feature mapping 606 can be processed with the decoder heads 612 and 614 of the decoder portion of the machine-learned watermark decoding model 601. More particularly, each decoder head 612/614 can be configured to process the feature mapping 606 and output a decoded block $D_i$ (e.g., 616, 616, etc.) with the same dimensions as each scale level $S_i$. For example, with a training video size of 8×128×128×3, the first decoder head 612 can process the feature mapping 606 to obtain first feature encoding 616, which can include first spatial-temporal dimensions $D_1 \in \mathbb{R}^{4 \times 64 \times 64 \times m}$, and the second decoder head 614 can process the feature mapping 606 to obtain second feature encoding 618, which can include second spatial-temporal dimensions $D_2 \in \mathbb{R}^{8 \times 128 \times 128 \times m}$. In some implementations, each decoder head 612/614 can include four Conv3D$_{3,3,3}$ operations, where the output channels can be, for example, 128,128, 256,512 for head 1, and 128,128,128,256 for head 2. Global average pooling can be applied to the feature encodings 616/618 $D_i$ to obtain a decoded vector $E_i \in \mathbb{R}^m$, which represents the decoded information from each decoder head. A column normalized weight matrix $W \in \mathbb{R}^{m \times 2}$ can, in some implementations, be applied to the decoded vectors of the feature encodings 616/618 as represented by:

$$M^w = W^T E. \quad (2)$$

The weighting portion 615 of the machine-learned watermark decoding model 601 can determine first weighting data 622 and second weighting data 620. The first weighting data 622 can correspond to the first spatial-temporal dimensions of the first feature encoding 616, and the second weighting data 620 can correspond to the second spatial-temporal dimensions of the second feature encoding 618. More particularly, the weighting data 620/622 $W_{ij}$ can represent the importance of the predictions from scale i for each bit j. W can be predicted per-video from the small weighting portion 615.

After determining the weighting data 620/620, the first feature encoding 616, the second feature encoding 618, the first weighting data 622, and the second weighting data 620 can be processed with the machine-learned watermark decoding model 601 to obtain the reconstructed message vector 624 (e.g., one or more final layers of the machine-learned watermark decoding model 601, etc.).

Figure 7:
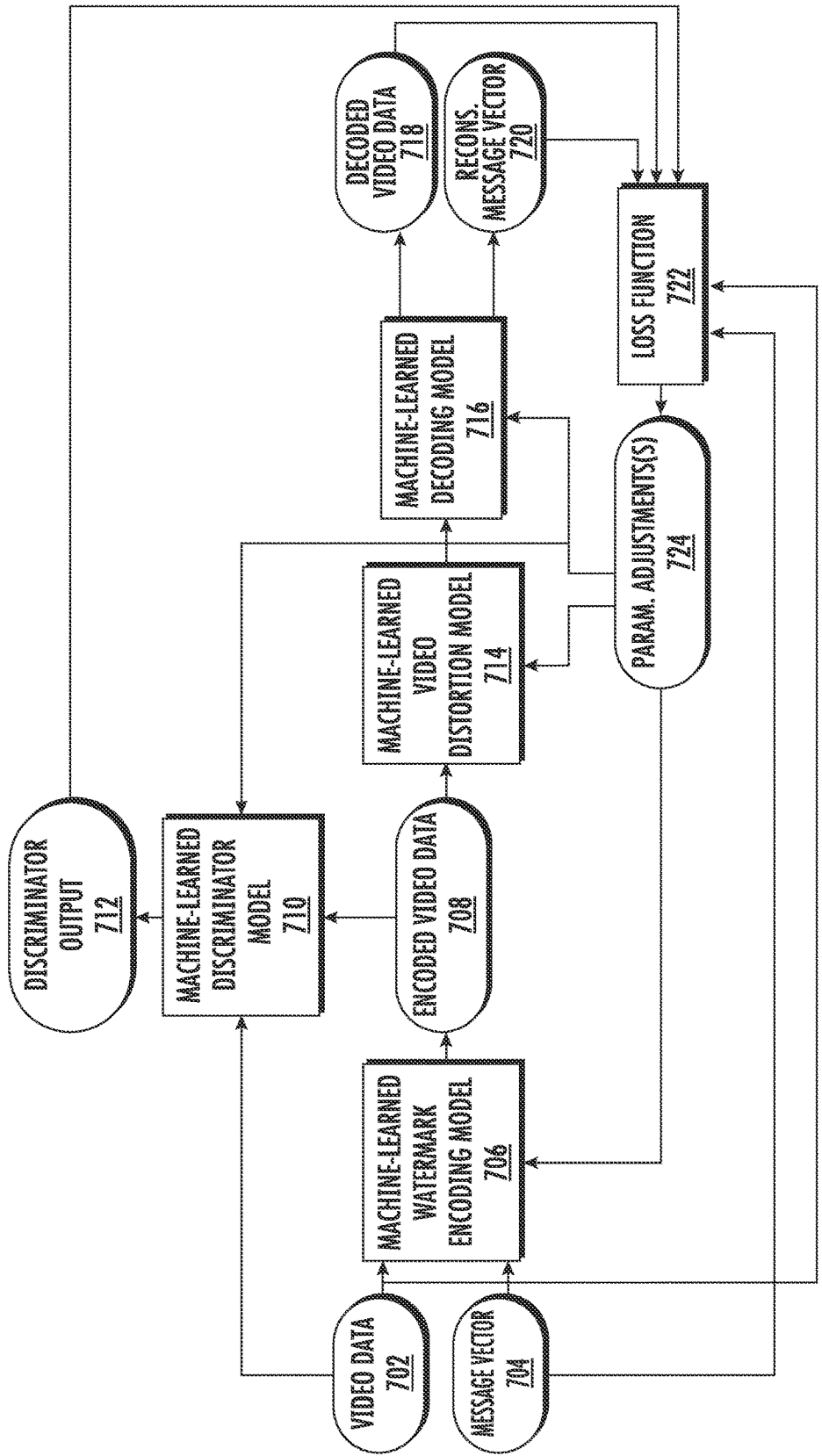
FIG. 7 depicts a data flow diagram of an example method for training at least a machine-learned watermark encoding model using a generative adversarial network architecture according to example embodiments of the present disclosure.

FIG. 7 depicts a data flow diagram of an example method for training at least a machine-learned watermark encoding model 706 using a generative adversarial network architecture 700 according to example embodiments of the present disclosure. More particularly, a message vector 704 can be obtained alongside video data 702. The message vector 704 can be any sort or type of vector that encodes a message. As an example, the message vector 704 can include a plaintext message. As another example, the message vector 704 can describe property rights information (e.g., copyright information, an identity of a device associated with playback or copying of the video data, etc.). As yet another example, the message vector 704 can include data lost from previous encoding of the video data 702 (e.g., data lost from encoding the video data 702 using a lossy encoding scheme, etc.). As yet another example, the message vector 704 can include a unique signifier associated with a creator or rights owner of the video data 702 (e.g., a unique cryptographic identifier associated with the creator or rights owner, etc.).

The video data 702 and the message vector 704 can be processed with the machine-learned watermark encoding model 706 to obtain spatial-temporal watermark encoding data. The spatial-temporal watermark encoding data can be descriptive of the message vector 704 or can otherwise describe the data included in the message vector 704. As an example, the spatial-temporal watermark encoding data can be describe a number of adjustments to one or more frames of the video data 702 that are configured to represent the message vector (e.g., slight adjustments to various properties of the video frame(s) (e.g., pixel value(s), etc.), etc.).

After obtaining the spatial-temporal watermark encoding data, encoded video data 708 can be generated that includes a plurality of encoded video frames. At least one of the encoded video frames of the encoded video data 708 can include the spatial-temporal watermark encoding data. As an example, the machine-learned watermark encoding model 706 can process the video data 702 and the message vector 704 to obtain the spatial-temporal watermark encoding data, which can be a predicted residual. This predicted residual can be added to one or more video frames of the video data 702 to generate the encoded video data 708 and the one or more encoded video frames that include the spatial-temporal watermark data. Alternatively, in some implementations, the machine-learned watermark encoding model 706 can process the video data 702 and the message vector 704 to obtain the encoded video data 708 with encoded video frame(s) that include the spatial-temporal watermark encoding data.

The encoded video data 708 can be processed using the machine-learned discriminator model 710 to obtain a discriminator output 712. The discriminator output 712 can be configured to indicate whether or not the encoded video data 708 includes the spatial-temporal watermark encoding data. More particularly, the discriminator output 712 will indicate that the encoded video data 708 either includes the spatial-temporal watermarking data or that the encoded video data 708 does not include the spatial-temporal watermarking data.

In some implementations, the machine-learned discriminator model 710 can process both the video data 702 and the encoded video data 708 to determine which of the two data files includes the spatial-temporal watermarking data. More particularly, the machine-learned discriminator model 710 can indicate that the encoded video data 708 includes the spatial-temporal watermarking data, or that the video data 702 includes the spatial-temporal watermarking data, but cannot indicate that both or neither include the spatial-temporal watermarking data. In such fashion, the discriminator output 712 can be evaluated using a loss function 722 to train the machine-learned watermark encoding model 706 to reduce and/or eliminate the perceptibility of the spatial-temporal watermark encoding data.

More particularly, in some implementations, the machine-learned discriminator model 710 can utilize neural networks. As an example, the machine-learned discriminator model 710 can be or otherwise include four residual networks, each taking a different temporal and spatial resolution of the video data 702 and the encoded video data 708. In such fashion, the machine-learned discriminator model 710 can be enabled to effectively discriminate both spatial and temporal inconsistency between the encoded video data 708 and the video data 702. For example, spatial resolutions can be reduced via resizing, and temporal reductions can be performed through frame sampling.

The encoded video data 708 can be processed with a machine-learned video distortion model 714 to apply one or more distortions to the encoded video data 708. More particularly, the machine-learned video distortion model 710 can be configured to apply distortions identical or substantially similar to those distortions seen in various video data 702 use cases (e.g., transmission loss distortion, compression distortion, etc.) in a differentiable fashion.

As an example, some lossy codecs can cause non-differentiable compression effects when utilized to encode video data 708. The one or more distortions applied by the machine-learned video distortion model 714 can include a compression effect (e.g., a differentiable effect configured to emulate the compression distortion caused by common video compression schemes, etc.). As another example, the one or more distortions can include dropping at least one of the encoded video frame(s). As another example, the one or more distortions can include swapping a first encoded video frame with a second encoded video frame temporally within the encoded video data. As another example, the one or more distortions can include any adjustment to pixel data of one or more of the encoded video frames (e.g., a blur effect, a noise effect, a color jitter effect, a cropping effect, etc.). In such fashion, the generation of the encoded video data 708 (e.g., application of the spatial-temporal watermark encoding data to the video data 702, etc.), can be made more robust to distortions caused by real-world video data use cases.

As a more particular example, one or more distortions applied by the machine-learned video distortion model 714 can include temporal distortions, spatial distortions, and/or a differentiable emulation of video compression effects. At training time, each distortion can be selected randomly with equal probability for each step of training. By randomly injecting distortions during the training process, both the machine-learned watermark encoding model 706 and the machine-learned watermark decoding model 716 can learn to be simultaneously robust to a variety of different distortions.

As an example, the machine-learned discriminator model 710 can be or otherwise include one or more three-dimensional convolutional neural networks (e.g., seven layers of 3D convolutions with a kernel size of 3, etc.). In some implementations, a residual connection can be added from the input to the last layer of the machine-learned discriminator model 710. The machine-learned discriminator model 710 can be trained to mimic the output of a lossy compression scheme (e.g., an H.264 codec, etc.) at a fixed and/or variable Constant Rate Factor (CRF). As an example, with CRF=25, the final trained machine-learned discriminator model 710 can provide a PSNR of 33.5 dB with respect to the real compressed output. Next, the weights of the machine-learned discriminator model 710 can be frozen, and it can be utilized to distort the encoded video data 708 during training of the machine-learned watermark encoding model 706 (e.g., according to the generative adversarial network architecture 700, etc.).

After distortion using the machine-learned discriminator model 710, the encoded video data 708 can be processed with a machine-learned watermark decoding model 716 to obtain a reconstructed message vector 720. The reconstructed message vector 720 can be identical or substantially similar to the message vector 704, and can include the message encoded within the message vector 704. Additionally, decoded video data 718 can also be obtained alongside the reconstructed message vector 720 as an output of the machine-learned watermark decoding model 716. Similarly, the decoded video data 718 can be identical or substantially similar to the video data 702.

A loss function can be evaluated 722. The loss function 722 can evaluate one or more of the discriminator output 712, a difference between the decoded video data 718 and the video data 702, or a difference between the message vector 704 and the reconstructed message vector 720. Based at least in part on the loss function 722, one or more parameters adjustment(s) 724 can be determined for at least one of the previously described model(s) 706, 710, 714, and/or 716. As an example, based at least in part on the loss function 722, parameter adjustment(s) can be generated for the machine-learned watermark encoding model 706, the machine-learned watermark decoding model 716, and the machine-learned discriminator model 714. To follow the previous example, the parameter(s) of the machine-learned video distortion model 714 can be frozen such that parameter adjustments 724 are not required for the model.

As a more particular example, the loss function 722 can evaluate the losses associated with at least the machine-learned discriminator model 710 and the machine-learned watermark encoding model 706 (e.g., using the Hinge loss formulation, etc.). The loss term associated with the machine-learned discriminator model 710 can generally optimizes $L_D$ while $L_G$ is added to the encoder-decoder loss in Eq. 5, as will be described subsequently.

$$L_D = \max\{0, 1-D(V_w)\} + \max\{0, 1+D(V_{in})\} \quad (3)$$

$$L_G = -D(V_w) \quad (4)$$

To follow the previous example, let $V_{in}$, $V_w$ respectively denote the input and output of the machine-learned watermark encoding model 706, while M and M' respectively denote the message vector 704 and the reconstructed message vector 720. For example, the following loss function can be defined as:

$$L_{total} = L_I(V_{in}, V_w) + c_1 L_M(M, M') + c_2 L_G(V_{in}, V_w) + c_3 VGG(V_{in}, V_w). \quad (5)$$

where $c_i$ are the scalar weights for each loss term. As demonstrated, $L_I$ can be the pixel-wise $l_2$-loss. $L_M$ can be the message loss given by the sigmoid cross-entropy. Finally, $L_G$ can be the loss from the discriminator output 712. Additionally, the loss function 722 can additionally include perceptual VGG loss between the video data 704 $V_{in}$ and the decoded video data 718 $V_w$, which can facilitate further improvements to the perceptual quality of the encoded video data 708. In some implementations, the machine-learned watermark encoding model 706 and the machine-learned watermark decoding model 716 can be trained jointly with respect to the perceptual VGG loss.

Example Methods

Figure 8:
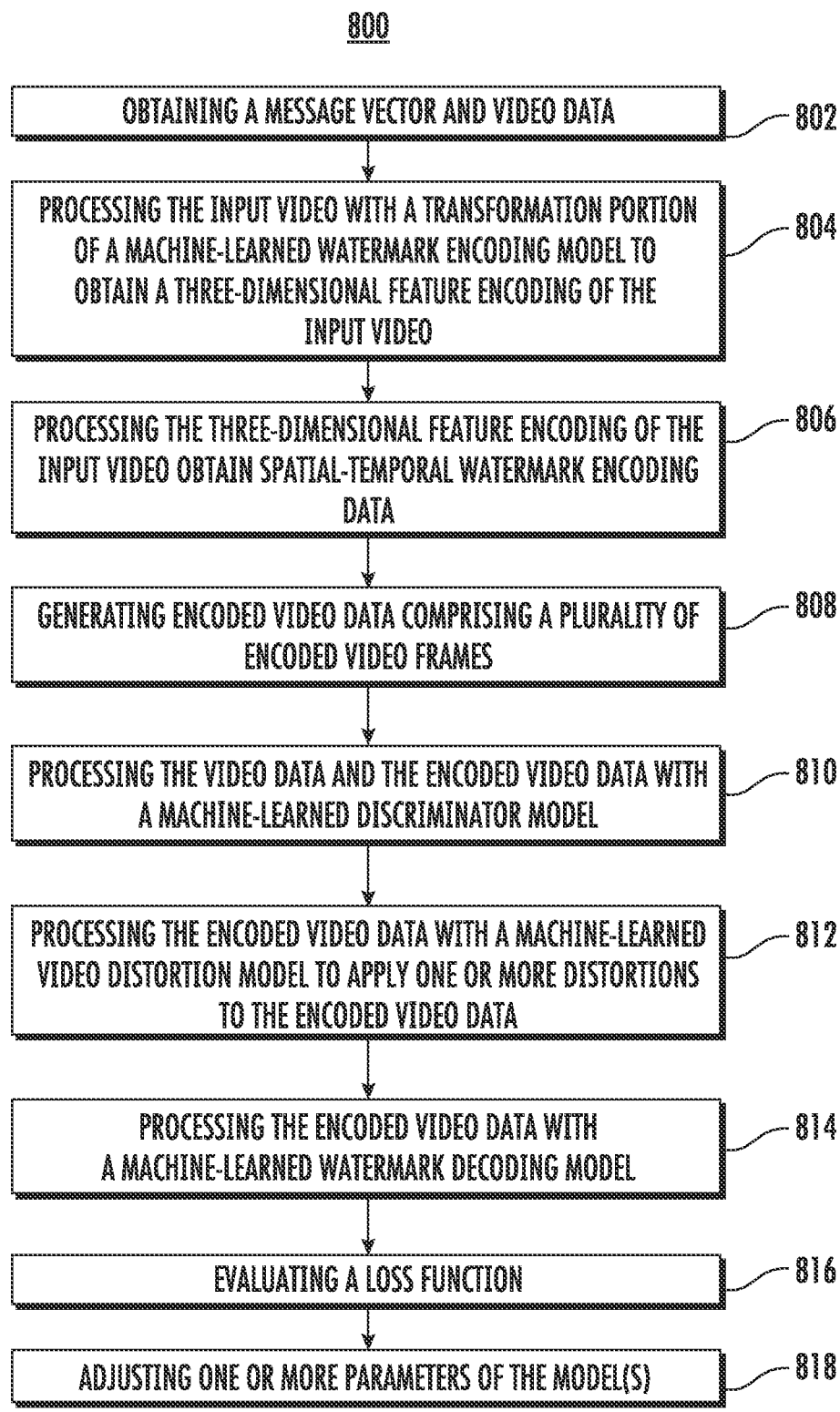
FIG. 8 depicts a flow chart diagram of an example method to perform training of a machine-learned watermark encoding model utilizing an end-to-end, generative adversarial network architecture according to example embodiments of the present disclosure.

FIG. 8 depicts a flow chart diagram of an example method 800 to perform training of a machine-learned watermark encoding model utilizing an end-to-end, generative adversarial network architecture according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, the computing system can obtain a message vector and video data. More particularly, the computing system can obtain a message vector alongside video data. The message vector can be any sort or type of vector that encodes a message. As an example, the message vector can include a plaintext message. As another example, the message vector can describe property rights information (e.g., copyright information, an identity of a device associated with playback or copying of the video data, etc.). As yet another example, the message vector can include data lost from previous encoding of the video data (e.g., data lost from encoding the video data using a lossy encoding scheme, etc.). As yet another example, the message vector can include a unique signifier associated with a creator or rights owner of the video data (e.g., a unique cryptographic identifier associated with the creator or rights owner, etc.). Additionally, the video data can be or otherwise include a plurality of video frames. In some implementations, the video data can be encoded using any conventional or machine-learned encoding scheme (e.g., HEVC/H, H. 264, MPEG-4, MP4, AVI, etc.).

At 804, the computing system can process the input video with a transformation portion of a machine-learned watermark encoding model to obtain a three-dimensional feature encoding of the input video.

At 806, a computing system can process the three-dimensional feature encoding of the input video obtain spatial-temporal watermark encoding data. More particularly, the computing system can process the three-dimensional feature encoding of the input video and the message vector with an embedding portion of the machine-learned watermark encoding model to obtain spatial-temporal watermark encoding data descriptive of the message vector.

At 808, the computing system can generate encoded video data comprising a plurality of encoded video frames. More particularly, the computing system can, after obtaining the spatial-temporal watermark encoding data, generate encoded video data that includes a plurality of encoded video frames. At least one of the encoded video frames can include the spatial-temporal watermark encoding data. As an example, the embedding portion of the machine-learned watermark encoding model can process the three-dimensional feature encoding(s) and the message vector to obtain the spatial-temporal watermark encoding data, which can be a predicted residual. This predicted residual can be added to one or more video frames of the video data to generate the encoded video data and the one or more encoded video frames that include the spatial-temporal watermark data. Alternatively, in some implementations, the embedding portion of the machine-learned watermark encoding model can process the three-dimensional feature encoding(s) and the message vector to obtain the encoded video data with encoded video frame(s) that include the spatial-temporal watermark encoding data.

At 810, the computing system can process the video data and the encoded video data with a machine-learned discriminator model. More particularly, the computing system can process the encoded video data and the video data using the machine-learned discriminator model to obtain a discriminator output configured to indicate which of the encoded video data or the video data includes the spatial-temporal watermark encoding data. More particularly, the discriminator output will indicate that one of the encoded video data or the video data includes the spatial-temporal watermark encoding data, but will not indicate that both the encoded video data and the video data include the watermark encoding data, and will not indicate that neither the encoded video data and the video data include the watermark encoding data. In such fashion, the discriminator output can be evaluated using a loss function to train the machine-learned watermark encoding model to reduce and/or eliminate the perceptibility of the spatial-temporal watermark encoding data.

At 812, the computing system can process the encoded video data with a machine-learned video distortion model to apply one or more distortions to the encoded video data. More particularly, the computing system can, prior to processing the encoded video data with the machine-learned watermark decoding model, process the encoded video data with the machine-learned video distortion model to apply one or more distortions to the encoded video data. More particularly, the machine-learned video distortion model can be configured to apply distortions identical or substantially similar to those distortions seen in various video-data use cases (e.g., transmission loss distortion, compression distortion, etc.) in a differentiable fashion.

As an example, some lossy codecs can cause non-differentiable compression effects when utilized to encode video data. The one or more distortions can include a compression effect (e.g., a differentiable effect configured to emulate the compression distortion caused by common video compression schemes, etc.). As another example, the one or more distortions can include dropping at least one of the encoded video frame(s). As another example, the one or more distortions can include swapping a first encoded video frame with a second encoded video frame temporally within the encoded video data. As another example, the one or more distortions can include any adjustment to pixel data of one or more of the encoded video frames (e.g., a blur effect, a noise effect, a color jitter effect, a cropping effect, etc.). In such fashion, the generation of the encoded video data (e.g., application of the spatial-temporal watermark encoding data to the video data, etc.), can be made more robust to distortions caused by real-world video data use cases.

At 814, the computing system can process the encoded video data with a machine-learned watermark decoding model to obtain a reconstructed message vector. More particularly, the encoded video data can be processed with a decoder portion of the machine-learned watermark decoding model to obtain a first feature encoding and a second feature encoding of the encoded video data. The first feature encoding can include first spatial-temporal dimensions, and the second feature encoding can include second spatial-temporal dimensions different than the first spatial temporal dimensions. Using a weighting portion of the machine-learned watermark decoding model, first weighting data and second weighting data can be determined (e.g., a weight vector, a weight tensor, etc.). The first weighting data can correspond to the first spatial-temporal dimensions of the first feature encoding, and the second weighting data can correspond to the second spatial-temporal dimensions of the second feature encoding. As an example, the first feature encoding can be a three-dimensional feature encoding of the encoded video data at a first scale (e.g., the first spatial-temporal dimensions, etc.). The weighting data can be or otherwise include a three-dimensional weight tensor with the same spatial-temporal dimensions as the first feature encoding. In such fashion, the weighting data can be applied to the feature encoding directly.

The first feature encoding, the second feature encoding, the first weighting data, and the second weighting data can be processed with the machine-learned watermark decoding model to obtain a reconstructed message vector. The reconstructed message vector can be identical or substantially similar to the message vector. In some implementations, prior to processing the encoded video data with the decoder portion of the machine-learned watermark decoding model, the encoded video data can be processed with a transformation portion of the machine-learned watermark decoding model to obtain a feature mapping of the encoded video data. This feature mapping can be processed with the decoder portion of the machine-learned watermark decoding model to obtain the first feature encoding and the second feature encoding of the encoded video data.

In some implementations, prior to processing the feature mapping of the encoded video data with the decoder portion of the machine-learned watermark decoding model, the feature mapping of the encoded video data can be processed with a detector portion of the machine-learned watermark decoding model to obtain a detector output. The detector output can be configured to indicate, for each of the plurality of encoded video frames, whether a respective encoded video frame comprises the spatial-temporal watermark encoding data descriptive of the message vector. In some implementations, processing the feature mapping of the encoded video data with the decoder portion of the machine-learned watermark decoding model can be based at least in part on the detector output.

At 816, the computing system can evaluate a loss function. More particularly, the computing system can evaluate a loss function that evaluates one or more of the discriminator output, a difference between the decoded video data and the video data, or a difference between the message vector and a reconstructed message vector.

At 818, the computing system can adjust one or more parameters of the model(s). More particularly, the computing system can, based at least in part on the loss function, adjust one or more parameters of at least one of the previously described model(s). As an example, based at least in part on the loss function, parameter(s) of at least one of the machine-learned watermark encoding model, the machine-learned watermark decoding model, the machine-learned video distortion model, or the machine-learned discriminator model can be adjusted. It should be understood that in some implementations, the parameter(s) of only some of these models may be adjusted. As an example, parameter(s) of the machine-learned discriminator model may be adjusted for a number of training iterations and then frozen while the parameter(s) of other models are adjusted over a number of subsequent training iterations. As another example, parameter(s) of the machine-learned video distortion model may be adjusted for a number of training iterations and then frozen while the parameter(s) of other models are adjusted over a number of subsequent training iterations. In such fashion, each of the previously described models can be trained in an end-to-end fashion.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for generating a watermark message embedding in video data, comprising:
   one or more processors;
   one or more tangible, non-transitory computer readable media storing computer-readable instructions that when executed by the one or more processors cause the one or more processors to perform operations, the operations comprising:
      obtaining a message vector and video data comprising a plurality of video frames;
      processing the video data with a transformation portion of a machine-learned watermark encoding model to obtain a three-dimensional feature encoding of the video data;
      processing the three-dimensional feature encoding of the video data and a three-dimensional message encoding of the message vector with an embedding portion of the machine-learned watermark encoding model to obtain spatial-temporal watermark encoding data descriptive of the message vector; and
      generating encoded video data comprising a plurality of encoded video frames, wherein at least one of the plurality of encoded video frames includes the spatial-temporal watermark encoding data.

2. The computing system of claim 1, wherein generating the encoded video data is based at least in part on an adjustable scaling factor that controls a perceptibility of the spatial-temporal watermark encoding data included in the plurality of encoded video frames.

3. The computing system of claim 1, wherein the operations further comprise processing the encoded video data with a machine-learned watermark decoding model to obtain a reconstructed message vector and decoded video data.

4. The computing system of claim 3, wherein, prior to processing the encoded video data with the machine-learned watermark decoding model, the operations comprise processing the encoded video data with a machine-learned video distortion model to apply one or more distortions to the encoded video data.

5. The computing system of claim 4, wherein the one or more distortions comprise at least one of:
   a compression effect;
   dropping at least one of the plurality of encoded video frames;
   swapping a first encoded video frame of the plurality of encoded video frames with a second encoded video frame of the plurality of encoded video frames;
   a blur effect;
   a noise effect;
   a color jitter effect; or
   a cropping effect.

6. The computing system of claim 4, wherein the operations further comprise processing the encoded video data with a machine-learned discriminator model to obtain a discriminator output that indicates whether the encoded video data includes the spatial-temporal watermark encoding data.

7. The computing system of claim 6, wherein the operations further comprise:
   evaluating a loss function that evaluates at least one of:
      the discriminator output;
      a difference between the decoded video data and the video data; or
      a difference between the message vector and the reconstructed message vector; and
   based at least in part on the loss function, adjusting one or more parameters of at least one of the machine-learned watermark encoding model, the machine-learned watermark decoding model, the machine-learned video distortion model, or the machine-learned discriminator model.

8. The computing system of claim 1, wherein the three-dimensional feature encoding of the video data comprises one or more spatial-temporal dimensions; and
   wherein processing the three-dimensional feature encoding of the video data and the message vector with the embedding portion of the machine-learned watermark encoding model comprises:
      processing the message vector with the embedding portion of the machine-learned watermark encoding model to obtain the three-dimensional message encoding, the three-dimensional message encoding corresponding to the one or more spatial-temporal dimensions;
      processing the three-dimensional message encoding and the three-dimensional feature encoding with the embedding portion of the machine-learned watermark encoding model to obtain a three-dimensional fused encoding; and
      processing the three-dimensional fused encoding with the embedding portion of the machine-learned watermark encoding model to obtain the spatial-temporal watermark encoding data descriptive of the message vector.

9. The computing system of claim 8, wherein processing the three-dimensional fused encoding with the embedding portion of the machine-learned watermark encoding model comprises:
   scaling the three-dimensional feature encoding of the video data to obtain a scaled three-dimensional feature encoding comprising one or more scaled spatial-temporal dimensions;
   processing the message vector with the embedding portion of the machine-learned watermark encoding model to obtain a scaled three-dimensional message encoding corresponding to the one or more scaled spatial-temporal dimensions;

processing the scaled three-dimensional message encoding and the scaled three-dimensional feature encoding with the embedding portion of the machine-learned watermark encoding model to obtain a three-dimensional scaled encoding; and processing the three-dimensional fused encoding and the three-dimensional scaled encoding with the embedding portion of the machine-learned watermark encoding model to obtain the spatial-temporal watermark encoding data descriptive of the message vector.

10. A computer-implemented method for decoding imperceptibly watermarked encoded video data, comprising:

obtaining, by a computing system comprising one or more computing devices, encoded video data comprising a plurality of encoded video frames, wherein one or more of the plurality of encoded video frames comprises spatial-temporal watermark encoding data representative of a message vector, the spatial-temporal watermark encoding data in the one or more the plurality of encoded video frames describing data in the message vector;

processing, by the computing system, the encoded video data with a decoder portion of a machine-learned watermark decoding model to obtain a first feature encoding and a second feature encoding of the encoded video data, wherein the first feature encoding comprises first spatial-temporal dimensions, and wherein the second feature encoding comprises second spatial-temporal dimensions different than the first spatial-temporal dimensions;

determining, by the computing system, first weighting data and second weighting data with a weighting portion of the machine-learned watermark decoding model, wherein the first weighting data corresponds to the first spatial-temporal dimensions and the second weighting data corresponds to the second spatial-temporal dimensions; and processing, by the computing system, the first feature encoding, the second feature encoding, the first weighting data, and the second weighting data with the machine-learned watermark decoding model to obtain a reconstructed message vector.

11. The computer-implemented method of claim 10, wherein:

the decoder portion comprises a plurality of decoder heads; and wherein processing the encoded video data with the decoder portion of a machine-learned watermark decoding model comprises:

processing, by the computing system, the encoded video data with a first decoder head of the plurality of decoder heads to obtain the first feature encoding comprising the first spatial-temporal dimensions; and processing, by the computing system, the encoded video data with a second decoder head of the plurality of decoder heads to obtain the second feature encoding comprising the second spatial-temporal dimensions different than the first spatial-temporal dimensions.

12. The computer-implemented method of claim 10, wherein:

prior to processing the encoded video data with the decoder portion of the machine-learned watermark decoding model, the method comprises processing, by the computing system, the encoded video data with a transformation portion of the machine-learned watermark decoding model to obtain a feature mapping of the encoded video data; and wherein processing the encoded video data with the decoder portion of the machine-learned watermark decoding model comprises processing, by the computing system, the feature mapping of the encoded video data with the decoder portion of the machine-learned watermark decoding model.

13. The computer-implemented method of claim 12, wherein, prior to processing the feature mapping of the encoded video data with the decoder portion of the machine-learned watermark decoding model, the method comprises:

processing, by the computing system, the feature mapping of the encoded video data with a detector portion of the machine-learned watermark decoding model to obtain a detector output, wherein the detector output is configured to indicate, for each of the plurality of encoded video frames, whether a respective encoded video frame comprises the spatial-temporal watermark encoding data descriptive of the message vector.

14. The computer-implemented method of claim 13, wherein processing the feature mapping of the encoded video data with the decoder portion of the machine-learned watermark decoding model is based at least in part on the detector output.

15. The computer-implemented method of claim 10, wherein, prior to processing the encoded video data with the decoder portion of the machine-learned watermark decoding model, the method comprises processing, by the computing system, the encoded video data with a machine-learned video distortion model to apply one or more distortions to the encoded video data.

16. The computer-implemented method of claim 15, wherein the one or more distortions comprise at least one of:

a compression effect configured to emulate one or more video compression schemes;

dropping at least one of the plurality of encoded video frames;

swapping a first encoded video frame of the plurality of encoded video frames with a second encoded video frame of the plurality of encoded video frames;

a blur effect;

a noise effect;

a color jitter effect; or a cropping effect.

17. The computer-implemented method of claim 10, wherein, prior to processing the encoded video data with the machine-learned watermark decoding model, the method comprises processing, by the computing system, the encoded video data with a machine-learned discriminator model to obtain a discriminator output that indicates whether the encoded video data includes the spatial-temporal watermark encoding data.

18. The computer-implemented method of claim 17, wherein the method further comprises:

evaluating, by the computing system, a loss function that evaluates at least one of:

the discriminator output;

a difference between decoded video data and the encoded video data; or a difference between the message vector and the reconstructed message vector; and adjusting, by the computing system based at least in part on the loss function, one or more parameters of at least one of the machine-learned watermark encoding model, the machine-learned watermark decoding model, a machine-learned video distortion model, or the machine-learned discriminator model.

19. One or more tangible, non-transitory computer readable media storing computer-readable instructions that when executed by one or more processors cause the one or more processors to perform operations, the operations comprising:
  obtaining a message vector and video data comprising a plurality of video frames;
  processing the message vector and the video data with a machine-learned watermark encoding model to obtain encoded video data comprising a plurality of encoded video frames, wherein at least one of the plurality of encoded video frames comprises spatial-temporal watermark encoding data representative of the message vector, the spatial-temporal watermark encoding data in the at least one of the plurality of encoded video frames describing data in the message vector;
  processing the encoded video data with a machine-learned discriminator model to obtain a discriminator output that indicates whether the encoded video data includes the spatial-temporal watermark encoding data;
  processing the encoded video data with a machine-learned watermark decoding model to obtain decoded video data and a reconstructed message vector;
  evaluating a loss function that evaluates at least one of:
    the discriminator output;
    a difference between the decoded video data and the video data; or
    a difference between the message vector and the reconstructed message vector; and
  adjusting, based at least in part on the loss function, one or more parameters of at least one of the machine-learned watermark encoding model, the machine-learned watermark decoding model, or the machine-learned discriminator model.

20. The one or more tangible, non-transitory computer readable media of claim 19, wherein, prior to processing the encoded video data with the machine-learned watermark decoding model, the operations comprise processing the encoded video data with a machine-learned video distortion model to apply one or more distortions to the encoded video data; and
  wherein adjusting the one or more parameters comprises adjusting, based at least in part on the loss function, one or more parameters of at least one of the machine-learned watermark encoding model, the machine-learned watermark decoding model, the machine-learned video distortion model, or the machine-learned discriminator model.

* * * * *